United States Patent
Kang et al.

(10) Patent No.: US 12,533,454 B2
(45) Date of Patent: Jan. 27, 2026

(54) DEVICE FOR WRAPPING OUTER WALL OF BLOOD VESSEL

(71) Applicant: TMD LAB CO. LTD, Seoul (KR)

(72) Inventors: Mi-Lan Kang, Seoul (KR); Se Won Yi, Busan (KR); Jeong-Kee Yoon, Daejeon (KR); Dae-Hyun Kim, Gyeonggi-do (KR)

(73) Assignee: TMD LAB CO., LTD, Seoul (KR)

( * ) Notice: Subject to any disclaimer, the term of this patent is extended or adjusted under 35 U.S.C. 154(b) by 937 days.

(21) Appl. No.: 17/769,411

(22) PCT Filed: Oct. 19, 2020

(86) PCT No.: PCT/KR2020/014279
§ 371 (c)(1),
(2) Date: Apr. 15, 2022

(87) PCT Pub. No.: WO2021/080275
PCT Pub. Date: Apr. 29, 2021

(65) Prior Publication Data
US 2024/0123133 A1    Apr. 18, 2024

(30) Foreign Application Priority Data
Oct. 21, 2019   (KR) ........................ 10-2019-0130895

(51) Int. Cl.
*A61M 1/36* (2006.01)
*A61L 31/04* (2006.01)
*A61L 31/14* (2006.01)

(52) U.S. Cl.
CPC ......... *A61M 1/3655* (2013.01); *A61L 31/041* (2013.01); *A61L 31/146* (2013.01); *A61L 2400/08* (2013.01); *A61M 2207/00* (2013.01)

(58) Field of Classification Search
CPC ............. A61M 1/3655; A61M 2207/00; A61L 31/041; A61L 31/146; A61L 2400/08;
(Continued)

(56) References Cited

U.S. PATENT DOCUMENTS

2009/0012607 A1    1/2009   Kim et al.
2013/0345671 A1   12/2013   Ryu et al.
(Continued)

FOREIGN PATENT DOCUMENTS

EP    2739327 A1      6/2014
EP    3608346 A1  *   2/2020   ............... A61F 2/06
(Continued)

OTHER PUBLICATIONS

Office Action from corresponding Japanese Patent Application No. 2022-523620, dated Apr. 21, 2023.
(Continued)

*Primary Examiner* — Jerrah Edwards
*Assistant Examiner* — Jose H. Trevino, III
(74) *Attorney, Agent, or Firm* — Harness, Dickey & Pierce, P.L.C.

(57) ABSTRACT

The present invention relates to a device capable of wrapping the outer wall of a blood vessel, and a method for manufacturing the device. If the device for wrapping the outer wall of a blood vessel of the present invention is used, the outer wall of a blood vessel is wrapped, and, thereby, vortex generation can be significantly decreased by controlling abnormal expansion of the blood vessel which can occur due to the difference in the characteristics of blood vessels in a vein-artery graft model. The present invention saves a blood vessel from a low-oxygen state by promoting generation of new blood vessels on the outer wall of the blood vessel via a regenerative inflammatory response caused by the material of the device, and provides synergy effects such as prevention of vascular stenosis and reinforcement of an outer muscular layer by guiding venous muscular cells to the outside.

8 Claims, 12 Drawing Sheets

(58) Field of Classification Search
CPC .................. A61L 31/148; A61L 31/04; A61B 2017/00526; A61B 2017/00871; A61B 2017/1107; A61B 2017/1132; A61B 17/11; A61F 2/06; A61F 2/064; A61F 2240/002; A61F 2/07
See application file for complete search history.

(56) References Cited

U.S. PATENT DOCUMENTS

| | | | |
|---|---|---|---|
| 2015/0011990 | A1 | 1/2015 | Qin et al. |
| 2018/0126046 | A1* | 5/2018 | Sung .................. A61P 9/14 |
| 2021/0102023 | A1 | 4/2021 | Sung et al. |

FOREIGN PATENT DOCUMENTS

| | | | |
|---|---|---|---|
| JP | 2018-522992 | A | 8/2018 |
| KR | 10-2009-0004027 | A | 1/2009 |
| KR | 10-2009-0107604 | A | 10/2009 |
| KR | 10-2012-0100527 | A | 9/2012 |
| KR | 10-2016-0017441 | A | 2/2016 |
| KR | 10-1906472 | B1 | 10/2018 |
| KR | 10-2018-0137914 | A | 12/2018 |
| WO | WO-2013/017639 | A1 | 2/2013 |

OTHER PUBLICATIONS

Extended European Search Report from corresponding European Patent Application No. 20880029, dated Nov. 11, 2022.
International Search Report from corresponding PCT Application No. PCT/KR2020/014279, dated Apr. 19, 2021.

* cited by examiner

DEVICE FOR WRAPPING OUTER WALL OF BLOOD VESSEL

CROSS-REFERENCE TO RELATED APPLICATIONS

This application is a national phase application of PCT Application No. PCT/KR2020/014279 filed on Oct. 19, 2020, which claims priority to Korean Patent Application No. 10-2019-0130895 filed on Oct. 21, 2019. The entire disclosures of the applications identified in this paragraph are incorporated herein by reference.

TECHNICAL FIELD

The present disclosure relates to an outer vascular wall-wrapping device and a fabrication method therefor.

BACKGROUND ART

A blood vessel stent is a medical device inserted into an occluded region of a blood vessel to keep the passageway open. A blood vessel stent is a metal or plastic mesh tube inserted into an angiostenosis site with an aid of a catheter to maintain blood flow in the lumen and alleviate the stenosis. Blood stents are generally 2-3 mm in diameter with a length of 10-30 mm. For use in the lower extremity artery, blood vessel stents may be 10 mm in diameter and 150 mm in length.

Consisting only of a mesh, metal stents for use in blood vessels suffer from the disadvantage of restenosis caused by growth of vascular endothelial cells inside the stents. Restenosis after metal stent placement occurs at a rate of 20-30% which is improved compared to that (40-50%) of conventional balloon dilatation, which improves blood flow with a balloon catheter only. However, after intervention with metal stent implantation, high restenosis was found in high-risk patient populations, especially, a patient population with diabetes mellitus, composite, high-risk coronary artery lesions, such as acute myocardial infarction, polyvascular disease, hepatocirrhosis, small coronary artery disease, restenosis lesion, bifurcation lesion, total occlusion lesion, main coronary artery lesion, and saphenous vein.

In order to overcome the drawback of restenosis, development was made of a drug-eluting stent, which is a stent coated with a drug and releasing the drug for a long period of time to prevent the restenosis caused by the growth of vascular endothelial cells in the stent lumen. However, cell growth inhibitors, etc. used in drug-eluting stents provoke inflammatory reactions which induce thrombosis, leading to re-occlusion of the blood vessels. This phenomenon, called stent thrombosis, is a thrombotic occlusion of a stent in which the drug-eluting stent inhibits the proliferation of vascular endothelial cells while clots formed by platelets and coagulation factors could otherwise block the stent lumen. To surmount the risk, an antiplatelet agent should be administered for a long period of time after the implantation of a drug-eluting stent.

For severe restenosis, coronary artery bypass graft surgery is conducted in which a substituent vessel such as left and right internal thoracic artery, saphenous vein, right gastroepiploic artery, aorta radialis, and the like, is grafted to the aorta, so as to restore normal blood flow to the heart. However, a difference in pressure between the two grafted vessels could cause side effects such as edema at the surgical locus, etc., and arterial and venous conduits at the surgical site may be blocked in the long run. Therefore, an outer vascular wall-wrapping stent was designed for preventing the excessive dilatation and edema due to a blood pressure difference at the grafted artery and vein site and the retrograde flow of blood to inhibit clot formation.

This outer vascular wall-wrapping stent can be applied to an arteriovenous fistula operation for hemodialysis. An arteriovenous fistula operation is a surgical procedure of creating a connection or passageway between an artery and a superficial vein such that the vein is expanded and strengthened like an artery to allow a large amount of blood to pass therethrough during continuous hemodialysis in patients with chronic renal failure. In this regard, a pressure difference between the grafted vessels may cause side effects such as edema at the surgical site, excessive expansion of the vein, etc. The outer vascular wall-wrapping stent sturdily wraps and holds the outer vascular wall at an arteriovenous fistula site, like an artery, to suppress edema at the surgical site and prevent excessive dilatation of the vein, whereby the rate of arteriovenous fistula reoperation in hemodialysis patients can be lowered in the long run.

SUMMARY

Technical Problem

Leading to the present disclosure, intensive and thorough research, conducted by the present inventors, into development of a device capable of preventing stenosis at an anastomosed site and suppressing the vessel dilatation caused by a difference in characteristic between the grafted vessels resulted in the finding that when wrapping an outer vascular wall, a porous tube-type device made of a biocompatible polymer material can prevent stenosis at an anastomosed site, especially, for example, a vein to artery graft site, and suppress the dilatation that may be caused by a difference in characteristic between the blood vessels.

Therefore, an aspect of the present disclosure is to provide an outer vascular wall-wrapping device.

Another aspect of the present disclosure is to provide a method for fabrication of an outer vascular wall-wrapping device.

Solution to Problem

According to an aspect thereof, the present disclosure provides a porous, outer vascular wall-wrapping device made of a biocompatible polymer material.

The present inventors conducted intensive and thorough research into the development of a device capable of preventing stenosis at an anastomosed site and suppressing the vessel dilatation caused by a difference in characteristic between the grafted vessels. As a result, it was found that when wrapping an outer vascular wall, a porous tube-type device made of a biocompatible polymer material can prevent stenosis at an anastomosed site, especially, for example, a vein to artery graft site, and suppress the dilatation that may be caused by a difference in characteristic between the blood vessels.

Figure 1:
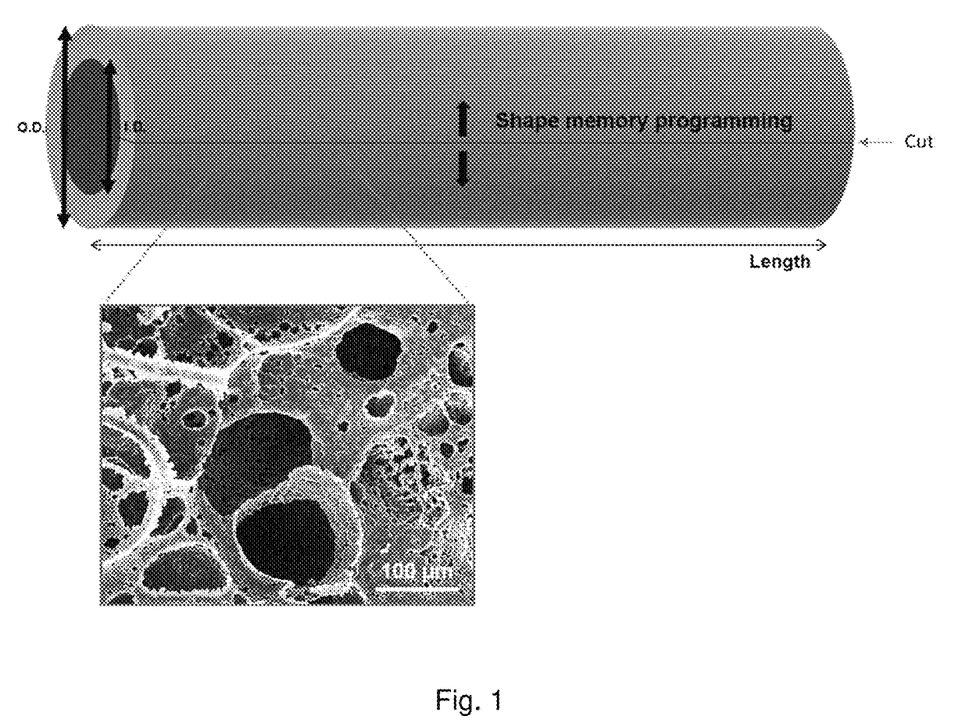
FIG. 1 shows a structure of the porous, blood vessel-wrapping device.

As a concept contrasting with the outer vascular wall-wrapping device of the present disclosure, stents designed in various practical forms to be inserted into blood vessels to prevent the closure of blood vessels are well known. The porous, outer vascular wall-wrapping device of the present disclosure functions to externally wrap the outer wall of a blood vessel and can be fabricated to have dimensions, such as inside diameter (I.D.), outer diameter (O.D.), length, etc., adjusted according to types and diameters of the blood vessel to be treated, and the purpose of intervention. For a concrete example, reference may be made to FIG. 1.

For convenience, the terms "porous, outer vascular wall-wrapping device", "outer vascular wall-wrapping device", "porous, blood vessel-wrapping device", "blood vessel-wrapping device", and "device for wrapping blood vessel" may be interchangeably used.

In an embodiment of the present disclosure, the outer vascular wall to which the outer vascular wall-wrapping device of the present disclosure is applied may be an outer vascular wall at an anastomosed site. For an anastomosed site, a difference in characteristic between anastomosed blood vessels, especially a difference in pressure resistance, which is an ability to endure a pressure generated by blood flow, may cause vessel dilatation in one of the two anastomosed blood vessels. An outer vascular wall-wrapping device according to an embodiment of the present disclosure can easily wrap the outer wall at an anastomosed site and effectively solve the dilatation in one of the two anastomosed blood vessels.

In an embodiment of the present disclosure, the anastomosed site to which the outer vascular wall-wrapping device of the present disclosure is applied may be a vein to artery graft site.

In an embodiment of the present disclosure, the outer blood vessel-wrapping device of the present disclosure has an original shape and a temporary shape, wherein the original shape is in a hollow cylindrical structure one side of which is cut in a lengthwise direction to allow a blood vessel to be inserted into the hollow space of the device, and the temporary shape may be temporarily formed by application of an external stimulus, has a curved or planar surface with the opposite ends formed by the cutting being apart from each other, and is recovered to the original shape as the device is bent in the direction of increasing the curvature by controllably decreasing the external stimulus so as to wrap the outer vascular wall.

The term "original shape", as used herein for the porous, outer vascular wall-wrapping device of the present disclosure, refers to a shape which is formed and maintained in the in-vivo condition. In light of a temperature condition, for example, the original shape is a shape formed at an average temperature of 28 to 42° C. including the body temperature.

The term "temporary shape", as used herein for the porous, outer vascular wall-wrapping device of the present disclosure, refers to a shape that is temporarily formed under the application of a predetermined external stimulus different from the general storage condition or in-vivo environment. Examples of the external stimulus include, but are not limited to, changes in temperature, physical power, pH, light, voltage, or osmotic pressure.

In an embodiment of the present disclosure, when the external stimulus is a change in temperature condition, it may be a temperature change into lower than 28° C. or higher than 42° C.

In an embodiment of the present disclosure, the change in temperature condition as the external stimulus may mean a change to a temperature higher than the body temperature. By way of example, the external stimulus that can induce the formation of "temporary shape" may be a temperature condition of 42° C. or higher, 43° C. or higher, 44° C. or higher, 45° C. or higher, 46° C. or higher, 47° C. or higher, 48° C. or higher, 49° C. or higher, or 50° C. or higher, but with no limitations thereto. Preferably, the temperature condition as the external stimulus inducing the formation of "temporary shape" is about 45° C. or higher in order to stably maintain the original shape after wrapping blood vessels.

In an embodiment of the present disclosure, the outer vascular wall-wrapping device of the present disclosure retains a recovered original shape after wrapping blood vessel.

In an embodiment of the present disclosure, the polymer material of the present disclosure may be a biodegradable polymer material.

In an embodiment of the present disclosure, the polymer material of the present disclosure may be a copolymer of an ε-caprolactone monomer and glycidyl methacrylate.

In an embodiment of the present disclosure, x % PCL (poly-ε-caprolactone)-co-y % PGMA (poly-glycidyl methacrylate) may be available as the polymer material of the present disclosure (wherein, x % and y % each represent mol % for corresponding units, with x+y=100 under the condition of x being 92 to 96).

Another aspect of the present disclosure provides a method for fabrication of an outer vascular wall-wrapping device, the method comprising the steps of:
(a) photo crosslinking a mixture of a biocompatible polymer material, a photoinitiator, and a porogen into a tube shape to prepare a tube-type device;
(b-1) removing the porogen from the prepared tube-type device;
(b-2) cutting one side of the prepared tube-type device in a lengthwise direction parallel to the central axis of the tube-type device; and
(c) fixing the one side-cut tube-type device in a temperature condition of less than 28° C. or 42° C. or higher into a temporary shape capable of being applied to an outer vascular wall.

By the method for fabrication of an outer vascular wall-wrapping device according to an aspect of the present disclosure, a temperature-responsive, shape memory device for wrapping an outer vascular wall can be fabricated. In greater detail, the blood vessel-wrapping device fabricated by the method of the present disclosure is transformed into the temporary shape described above at a temperature condition lower than room temperature (less than 28° C.) or a temperature condition (42° C. or higher) higher than the body temperature (ca. 36.5-37° C.) and recovered to the original shape when placed under a condition similar to the in-vivo environment. More specifically, the blood vessel-wrapping device fabricated by the fabrication method of the present disclosure may be converted into a temporary shape described herein at a high temperature condition (42° C. or higher) compared to the body temperature (ca. 36.5-37° C.) and can be recovered to the original shape in an in vivo-like environment.

In an embodiment of the present disclosure, the fabrication method is elucidated in detail in a stepwise manner as follows.

Step (a): Photo-Crosslinking Mixture of Biocompatible Polymer, Photoinitiator, and Porogen into Tube Shape to Prepare Tube-Type Device In an embodiment of the present disclosure, the biocompatible polymer refers to a safe material that does neither cause a significant rejection response upon in-vivo implantation, nor has non-temporary adverse influence in vivo. Materials that may cause mild inflammation upon wrapping of blood vessels, thus forming a neo-adventitia can fall within the scope of the biocompatible polymer available in the present disclosure. However, a polymer material that causes such a side reaction leading to neointimal formation is improper for use in the present disclosure.

In an embodiment of the present disclosure, the polymer material of the present disclosure may be a copolymer of ε-caprolactone monomers and glycidyl methacrylate.

In an embodiment of the present disclosure, x % PCL (poly-ε-caprolactone)-co-y % PGMA (poly-glycidyl methacrylate) may be available as the polymer material of the present disclosure (wherein, x % and y % each represent mol % for corresponding units, with x+y=100 under the condition of x being 92 to 96).

As used herein, the term "photoinitiator" means a material that can initiate and/or accelerate photo crosslinking of polymer materials and, more specifically, refers collectively to a material that is added to, for example, a composition to be UV crosslinked or cured and absorbs energy from an UV light source to initiate the crosslinking of the polymer material. So long as it is known in the art, any photoinitiator may be used in the practice of the present disclosure, without limitations. Examples of the photoinitiator include commercially available products such as 1,5,7-triazabicyclo[4.4.0]dec-5-ene 9 (TBD), tin(II) 2-ethylhexanoate, trimethylopropane tris(3-mercaptopropionate), zinc succinate, and phenylbis(2,4,6-trimethylbenzoyl)phosphine oxide (Igacure), but are not limited thereto.

As used herein, the term "porogen" refers to a material that is used to make pores in a cured polymeric structure. Following curing of the polymer material, porogens are removed to obtain a porous polymer structure in which pores are formed at the portions occupied by the porogens.

In an embodiment of the present disclosure, the porogen of the present disclosure may be at least one selected from the group consisting of gelatin, sodium chloride, sodium bicarbonate, ammonium bicarbonate, polyethylene glycol, and hexane. For example, when used as a porogen, gelatin may be mixed together with a PCL-co-PGMA copolymer and a photoinitiator, followed by UV curing. Treatment with water at 40° C. for 24 hours dissolves the gelatin out of the cured polymer structure. When used as porogens, sodium chloride, sodium bicarbonate, ammonium bicarbonate, polyethylene glycol, and hexane can each be dissolved out in the same manner as for gelatin.

In order to implement this step, the biocompatible polymer may be dispersed in an amount of 40 to 60% by weight and more particularly in an amount of about 50% by weight in, for example, dichloromethane. The photoinitiator may also be dispersed in an amount of 5 to 15% by weight and more particularly in an amount of about 10% by weight in a generally used, commercially available solvent, for example, dichloromethane. The dispersions thus obtained may be mixed at a volume ratio of 15:1 to 5:1, particularly at a volume ratio of 12:1 to 8:1, and more particularly at a volume ratio of 10:1. The dispersion mixture may be mixed at a weight ratio of 1:2 to 2:1 and more particularly at a weight ratio of about 1:1 (w/w %) with a porogen to prepare a final mixture.

Figure 2:
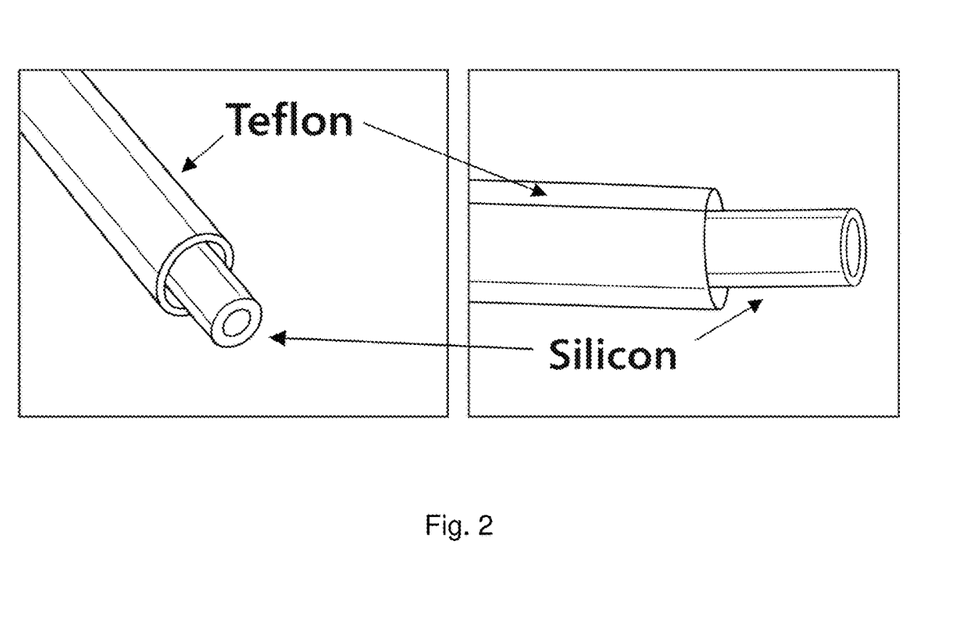
FIG. 2 shows a mold structure in a tube shape.
Figure 3:
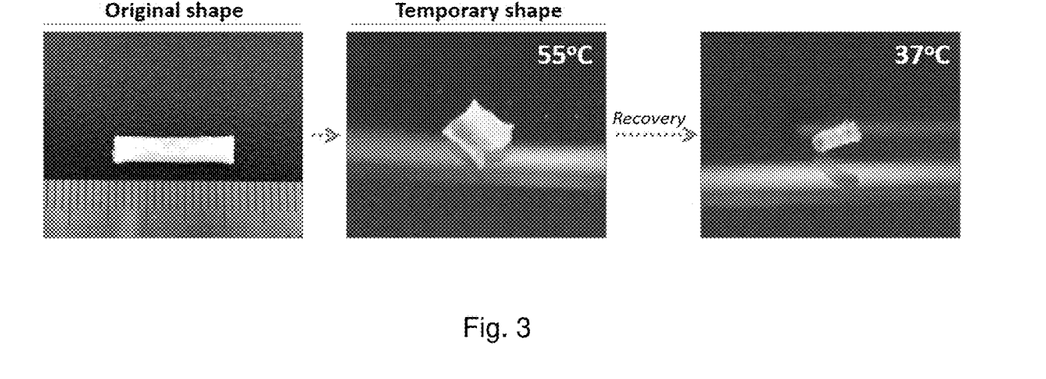
FIG. 3 illustrates the working mechanism of the porous, blood vessel-wrapping device.

The final mixture thus obtained may be fixed in the form of a tube before being cured. In order to fix the final mixture in a tube form, the final mixture may be spray injected into the empty space of a mold for the tube form. In a concrete embodiment of the present disclosure, the mold having an empty space in a tube shape may be manufactured by inserting a silicone tube into a Teflon tube, but with no limitations thereto (see FIG. 2). The final mixture is crosslinked in a UV crosslinking device. The UV curing time may be properly adjusted depending on properties of the polymer materials and photoinitiators employed. Commercially available UV curing lamp systems may be used without limitations.

(b-1) Step of Removing Porogen from Prepared Type-Type Device; and
(b-2) Step of Cutting One Side of Prepared Tube-Type Device in Lengthwise Direction Parallel to Central Axis of Tube Steps (b-1) and (b-2) may be performed in any order.

As stated above, in an embodiment of the present disclosure, porogen may be at least one selected from the group consisting of gelatin, sodium chloride, sodium bicarbonate, ammonium bicarbonate, polyethylene glycol, and hexane. In detail, for example, when used as a porogen, gelatin may be mixed together with a PCL-co-PGMA copolymer and a photoinitiator, followed by UV curing. The gelatin is dissolved out of the cure polymer structure by treatment overnight with water at 40° C. When used as porogens, sodium chloride, sodium bicarbonate, ammonium bicarbonate, polyethylene glycol, and hexane can each be dissolved out in the same manner as for gelatin.

Following removal of porogen, the cured polymer structure is separated from the mold and may be sufficiently washed.

After or before the porogen removal step, a step of cutting one side of the tube-type device in a lengthwise direction parallel to the central axis of the tube-type device.

Step (c): Fixing One Side-Cut Tube-Type Device in Temperature Condition Higher than the Body Temperature into a Temporary Shape Allowing Blood Vessel to be Inserted Thereinto In an embodiment of the present disclosure, a "temperature condition exceeding the body temperature" for inducing a temporary shape may be a condition of 42° C. or higher, 43° C. or higher, 44° C. or higher, 45° C. or higher, 46° C. or higher, 47° C. or higher, 48° C. or higher, 49° C. or higher, or 50° C. or higher, particularly, 42° C. to 65° C., more particularly, 45° C. to 65° C., and even more particularly 50° C. to 60° C. Subsequently, the temporary shape may be fixed at a temperature less than room temperature (1-30° C.). More particularly, the temporary shape may be fixed at a sufficiently low temperature, for example, in a dry ice condition (ca. −70° C.).

According to an embodiment thereof, the present disclosure may further comprise a step of additionally providing pores subsequently to any of steps (a) to (c). The additional provision of pores according to the present disclosure may be achieved by punching the cured polymer structure, for example, by biopsy punch. In another embodiment, pores may be additionally provided using a femtosecond laser or with the aid of a mold capable of forming a porous structure. The pores formed by the above methods may have a mean diameter of 100 μm to 1000 μm, 200 μm to 700 μm, or 300 μm to 500 μm. In this regard, the porosity may be adjusted in the range of 30 to 80% relative to the total area of the stent. In another embodiment, the porosity may be adjusted between 40 and 75% or between 50 and 70%.

Because the fabrication method of the present disclosure is directed toward the fabrication of the "porous, outer vascular wall-wrapping device" according to another aspect of the present disclosure, its content is incorporated herein and the common contents between these two are omitted in order to avoid undue complexity of this specification.

According to another aspect thereof, the present disclosure provides a porous, outer vascular wall-wrapping device fabricated by a method for fabrication of a porous, outer vascular wall-wrapping device.

Advantageous Effects of Invention

Features and advantages of the present disclosure are summarized as follows:
(a) The present disclosure provides a porous, outer vascular wall-wrapping device.
(b) The present disclosure provides a method for fabrication of a porous, outer vascular wall-wrapping device.
(c) When applied, the porous, outer vascular wall-wrapping device wraps the outside of a blood vessel to regulate the abnormal blood vessel dilatation that may be caused by a difference in characteristic between the blood vessels in a vein to artery graft model, thereby remarkably reducing turbulence thereat. In addition, the regenerative inflammation by the device material promotes angiogenesis at the outer wall of blood vessels, rescues blood vessels in a hypoxic condition, and guides myocytes of venous vessels to the outside, thereby exhibiting a synergistic effect of preventing vascular stenosis and reinforcing the muscularis externa.

The device can effectively suppress blood vessel dilatation in a physical manner and induce angiogenesis between the blood vessel and the blood vessel-wrapping device to form neo-adventitia. In addition, the device can prevent blood vessel stenosis upon anastomosis.

DETAILED DESCRIPTION

A better understanding of the present disclosure may be obtained through the following examples, which are set forth to illustrate, but are not to be construed as limiting the present disclosure.

EXAMPLES

Example 1: Fabrication of Porous, Blood Vessel-Wrapping Device with ε-Caprolactone Monomer (CL) and Glycidyl Methacrylate (GMA) Copolymer A solution of 94% PCL-co-6% PGMA in 0.1 w/v % photoinitiator (Irgacure)-containing dichloromethane was mixed at a ratio of 1:1 w/w % with a porogen (gelatin). A silicone tube was inserted into a Teflon tube having a blood vessel outer diameter to be installed (device outer/inner) and the polymeric mixture was sprayed into a space between the tubes to form a tube shape, followed by UV crosslinking for a specific time (600 s) in a UV curing lamp system (Omni-Cure S2000). The gelatin was dissolved out by leaving the cured structure in 40° C. distilled water for 24 hours. Following removal of the Teflon tube and the silicone tube, the tube structure thus obtained was washed in 25° C. distilled water for one week while shaking. The tube-type device was cut in a lengthwise direction (see FIG. 1) and induced to be transformed into a temporary shape in 55° C. which was fixed by freezing on dry ice (−80° C.). Subsequently, a porous structure having a predetermined number of pores (size: 300-500 μm) per unit area of the device was made using a biopsy punch and then sterilized with EO gas.

Example 2: Effect of Porous, Blood Vessel-Wrapping Device 2-1. Assay for Cellular Behaviors in Porous, Blood Vessel-Wrapping Device Comparison cytotoxicity, adhesion, proliferation for human venous smooth muscle cells (hSMCs) was made between the porous, blood vessel-wrapping device or a tissue culture polystyrene (TCPS) after in vitro incubation. The device was evaluated for compatibility with cell by a live & dead assay and for cell adhesion and proliferation by CCK-8 (cell counting kit-8) assay. Also, cell circularity was assayed by F-actin staining (phalloidin staining).

Figure 4:
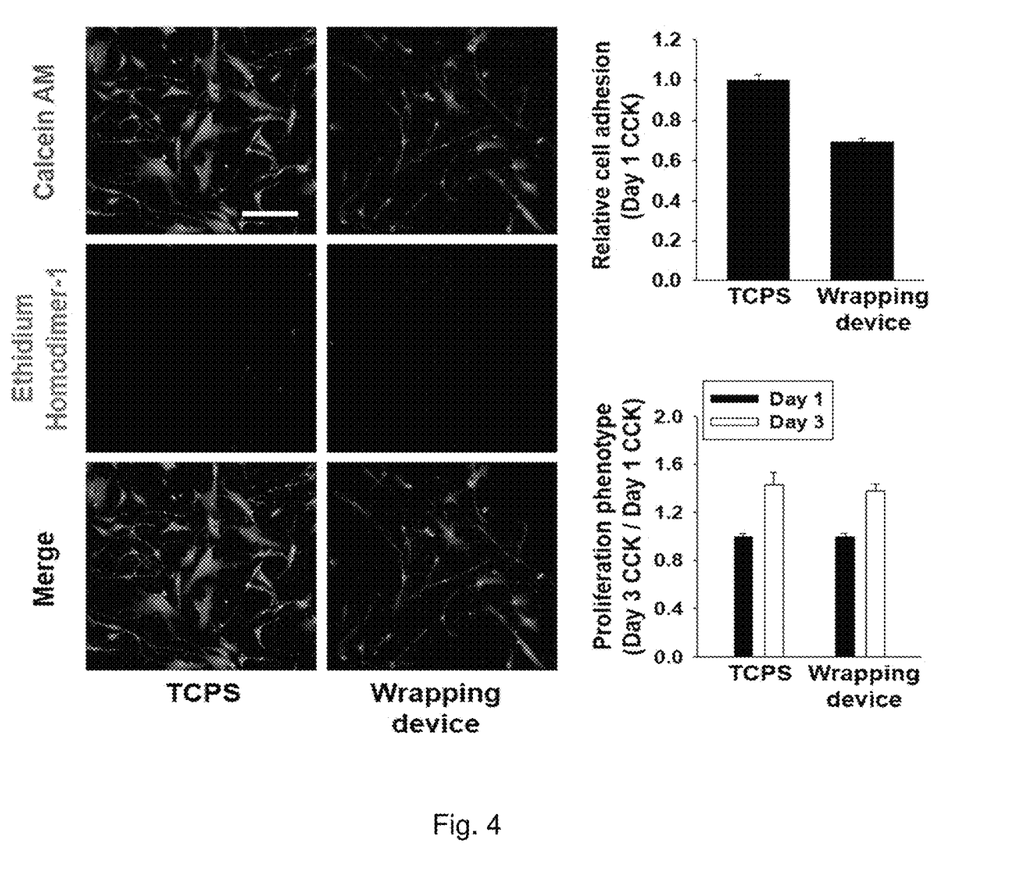
FIG. 4 shows observation results of cell adhesion and proliferation after hSMCs were incubated in the blood vessel-wrapping device.
Figure 5:
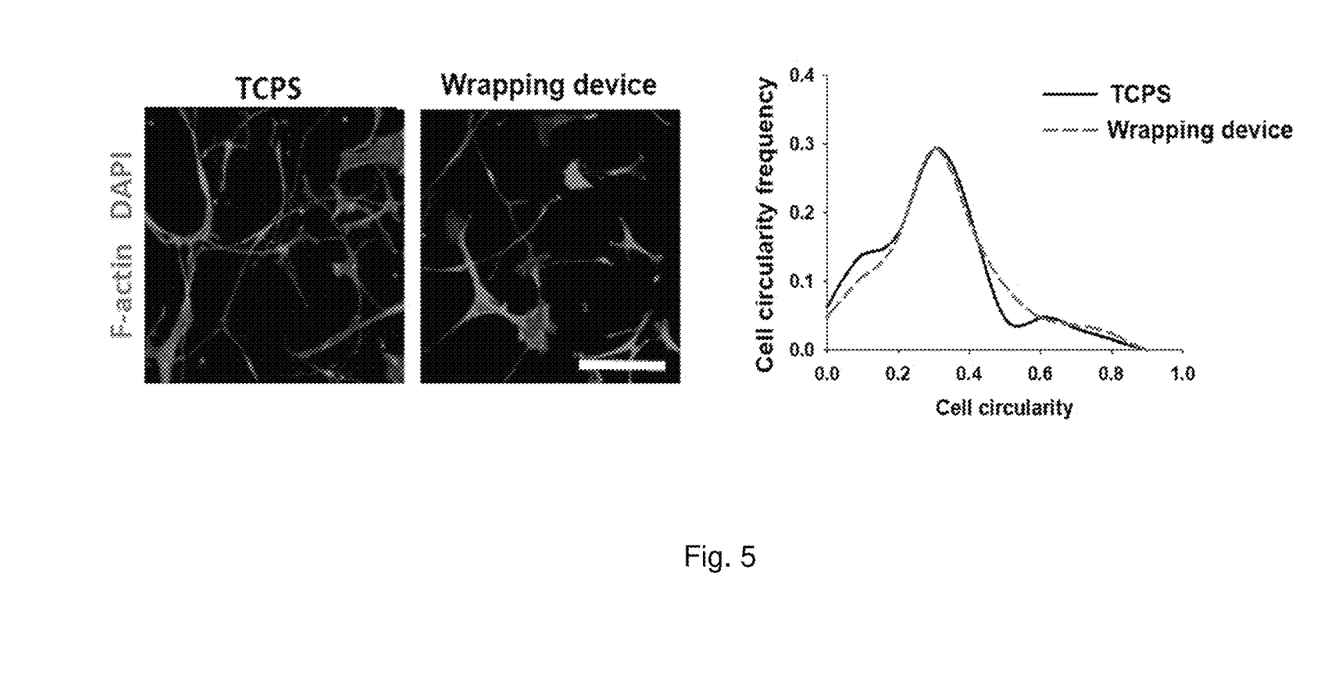
FIG. 5 shows morphologies of human smooth muscle cells incubated in the blood vessel-wrapping device and quantitative results of their circularity.

On day 3 after cell plating, the porous, blood vessel-wrapping device was found to induce no death of hSMCs as measured by Live&Dead assay. On day 1 after cell plating, the relative cell adhesion was examined using CCK-8 assay. Also, the proliferation phenotype was determined by dividing the number of cells on day 1 by that on day 3. The cell adhesion and proliferation were decreased in the porous, blood vessel-wrapping device, compared to TCPS. In light of the fact that healthier smooth muscle cells are, the slower their proliferation rate is, the wrapping device was indirectly demonstrated to have no adverse influences on behaviors of the smooth muscle cells (see FIG. 4). On day 3 after hSMCs plating, F-actin staining (phalloidin staining) was performed. No significant differences in cell morphology were found between the wrapping device and TCPS. Normal smooth muscle cells have a long, elongated shape, so their circularity is low. Similar circularity was observed on TCPS and the shape memory polymer. As a result, it was confirmed that the shape memory polymer did not significantly affect the phenotypic change of smooth muscle cells compared to TCPS (see FIG. 5).

2-2. Establishment of Vein to Artery Graft Rabbit Model and Introduction of Porous, Blood Vessel-Wrapping Device The jugular vein in a rabbit was dissected at two sites and excised after blood flow was blocked therebetween. A segment of the carotid artery was removed by blocking the blood flow with clamps and dissecting. The excised jugular vein segment was anastomosed to the dissected carotid artery with 9-0 suture. Thereafter, blood flows at anastomosed sites were confirmed. The porous, blood vessel-wrapping device was applied to the anastomosed sites and recovered to the original shape by flowing 40° C. saline.

2-3. Inhibitory Effect of Porous, Blood Vessel-Wrapping Device on Vein to Artery Graft Stenosis For four weeks after blood vessel wrapping in the rabbit model, vascular stenosis was monitored by tissue analysis.

Immediately after the vein to artery graft model was established, vascular wrapping using the porous, blood vessel-wrapping device was applied. Four weeks later, the vein region including the anastomosed sites was examined for stenosis. Examination was made of the vein shape and size by H&E staining and of the neointima and neo-adventitia formed in the vein by pentachrome staining.

Figure 6:
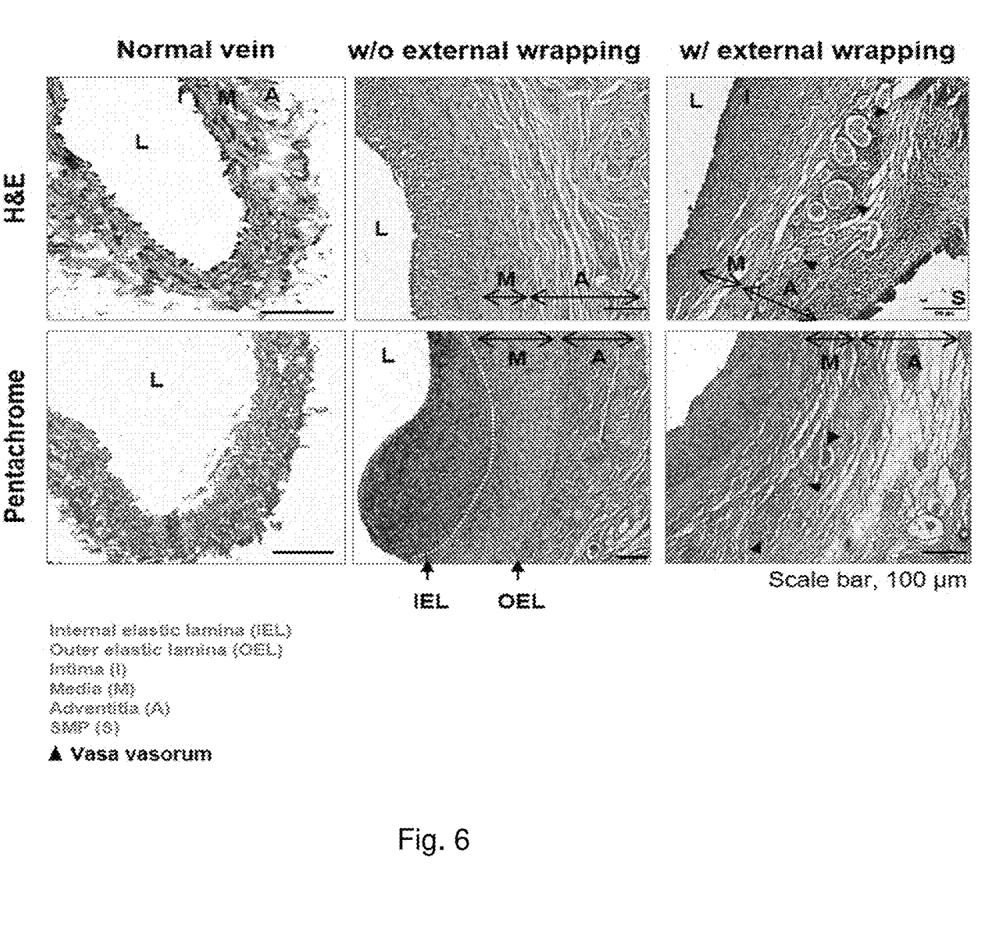
FIG. 6 shows histological assay results. In the pentachrome staining, nuclei and elastic fibers are expressed in black, collagen in yellow, ground substance and mucin in blue, fibrinoids and fibrins in intense red, and muscles in red.

Compared to normal vein, the group to which the wrapping had not been applied (w/o external wrapping) was observed to undergo excessive dilatation of the vein lumen and vascular wall. In this group, the mean vein size was measured to be 1,450 mm for the inner diameter of the media layer. Neointimal formation was also observed. In contrast, the vein was suppressed from undergoing excessive dilatation in the wrapping-applied group (w/ external wrapping) (mean media diameter=1270 mm) and neointimal formation was not observed, either. On the other hand, neo-adventitia was detected due to mild inflammation between existing blood vessels and the porous wrapping device (see FIG. 6).

The device was examined for effects on angiogenesis and neointimal formation by immunostaining to Flk1 and α-SMA (alpha smooth muscle actin).

Figure 7:
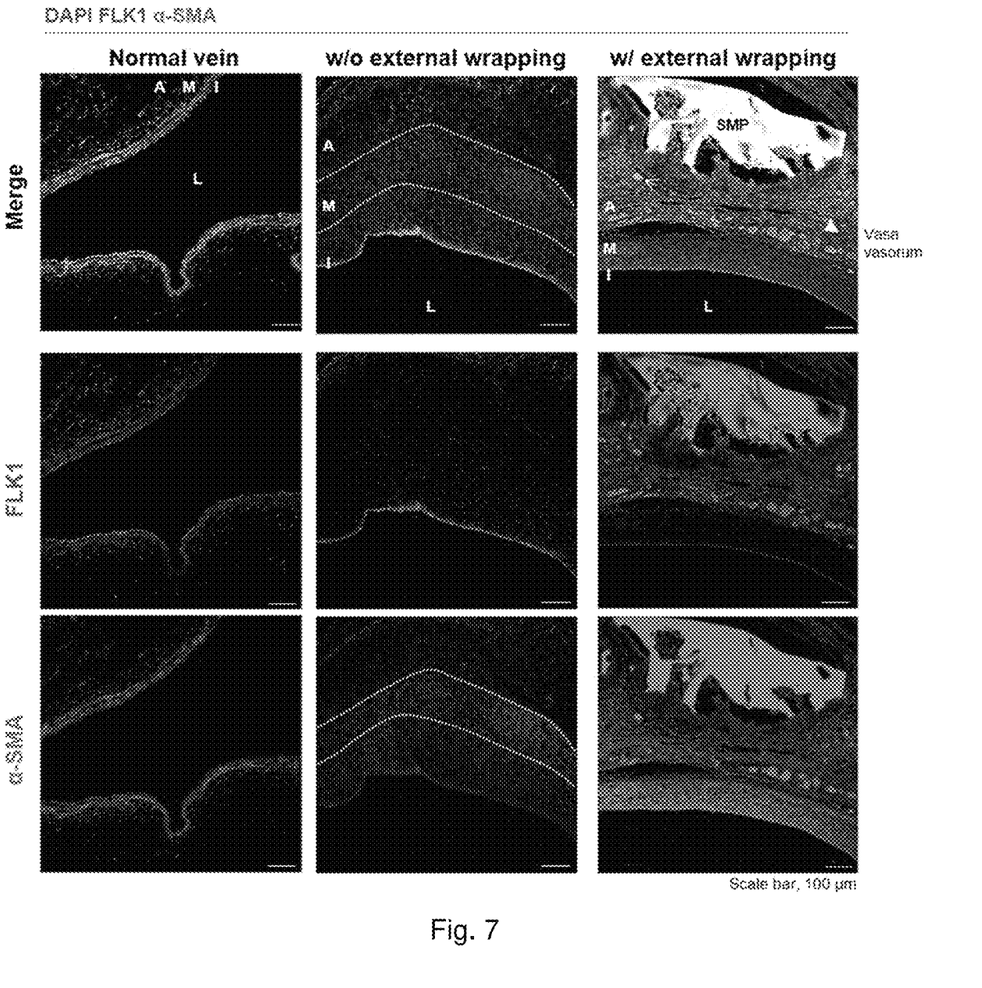
FIG. 7 shows immunofluorescent results, indicating that the mild inflammation induced resulted in neoadventitia and angiogenesis (neo-vasa vasorum).
Figure 8A:
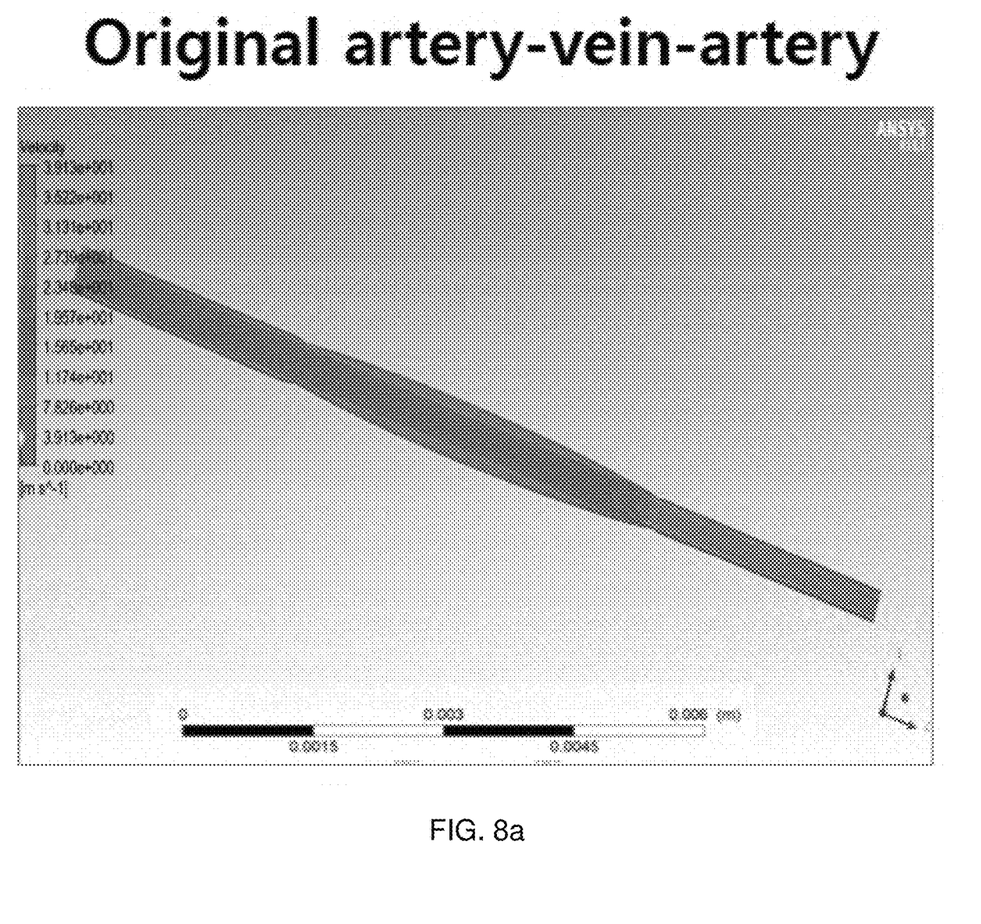
FIGS. 8a, 8b, 8c, 8d, 8e and 8f illustrate the stenosis-preventing mechanism of the blood vessel wrapping.
Figure 8B:
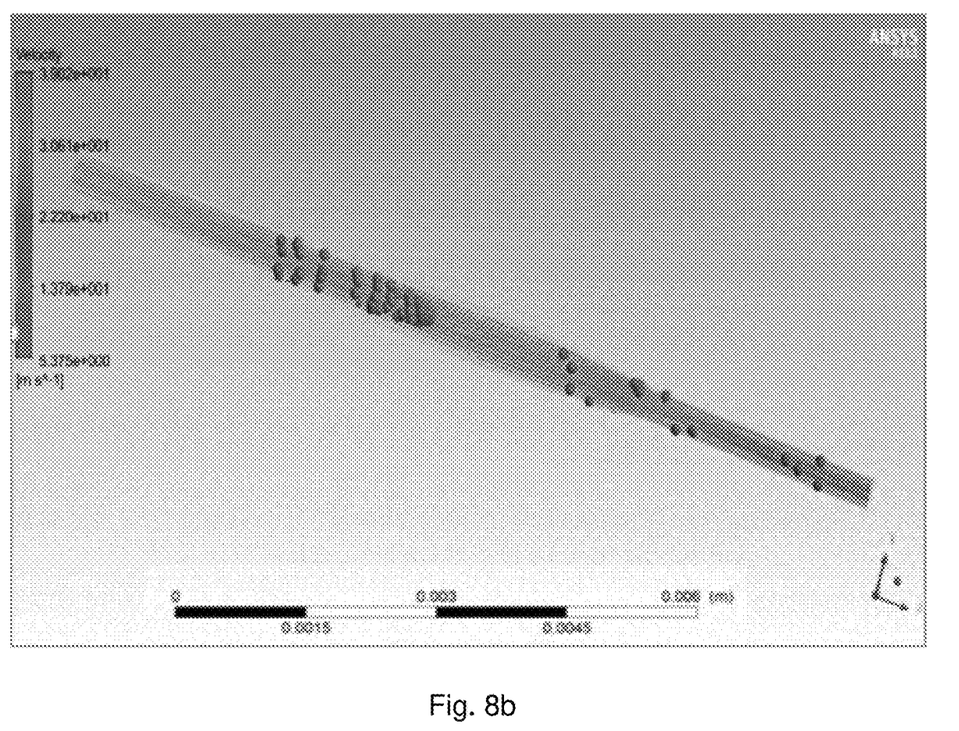
Figure 8C:
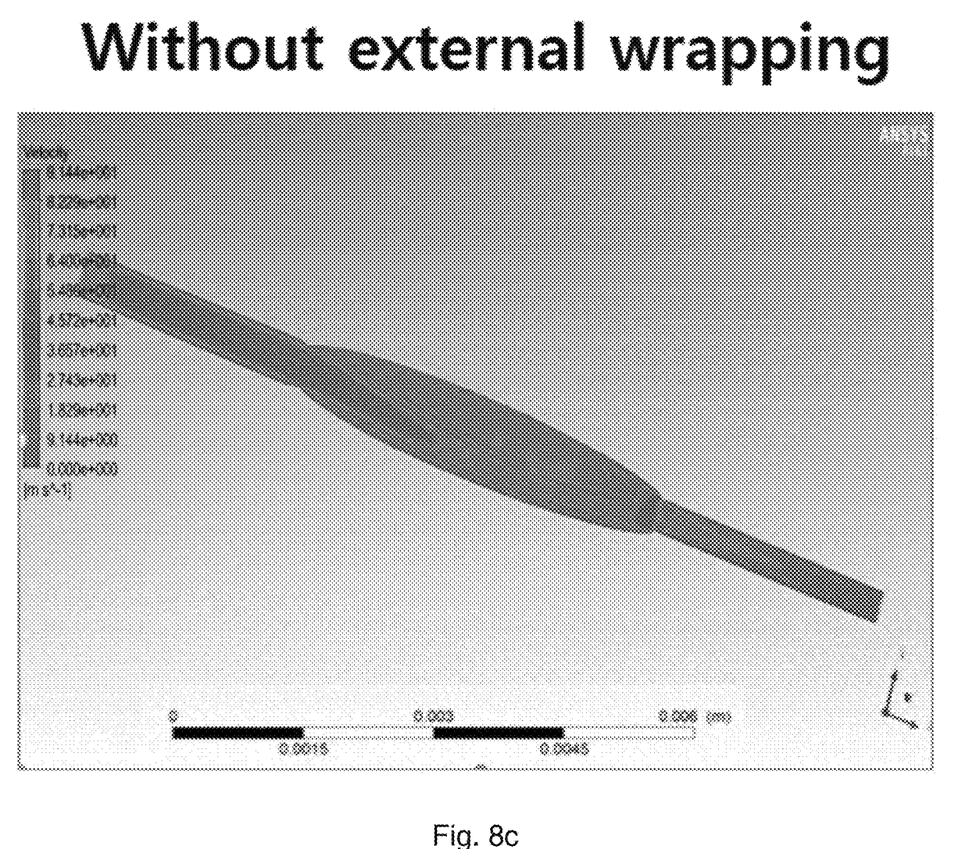
Figure 8D:
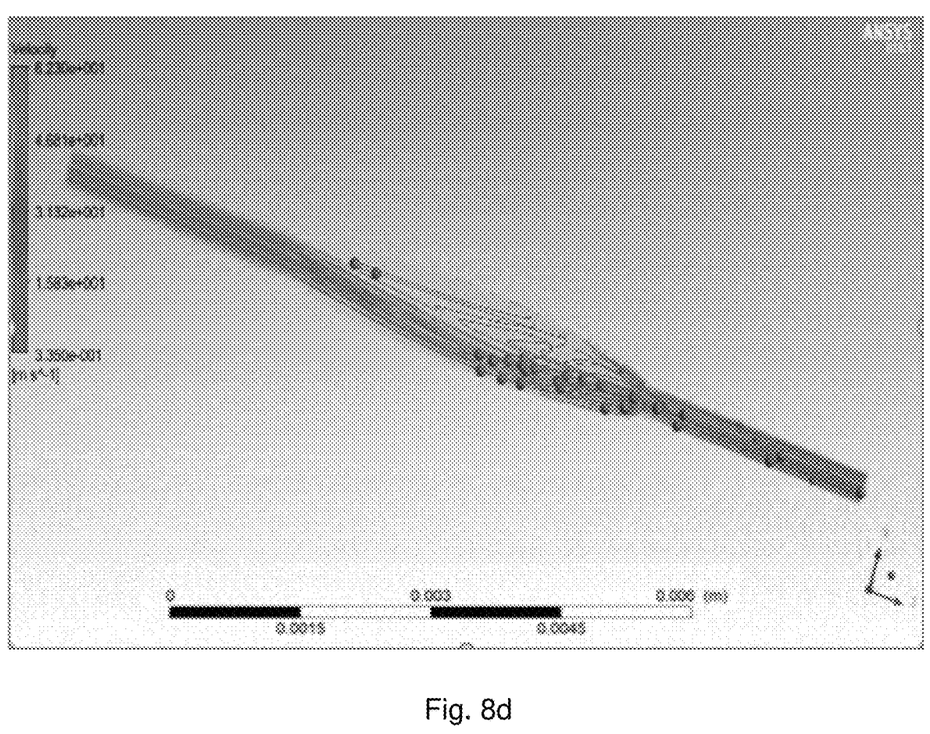
Figure 8E:
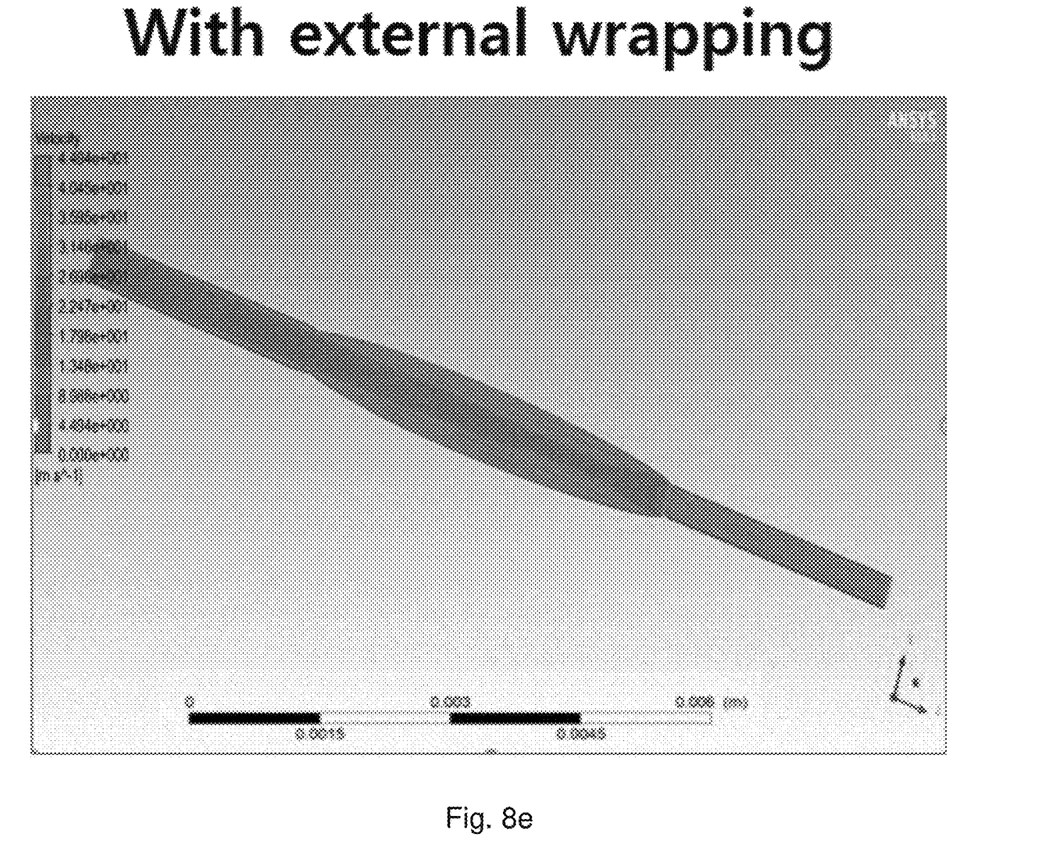
Figure 8F:
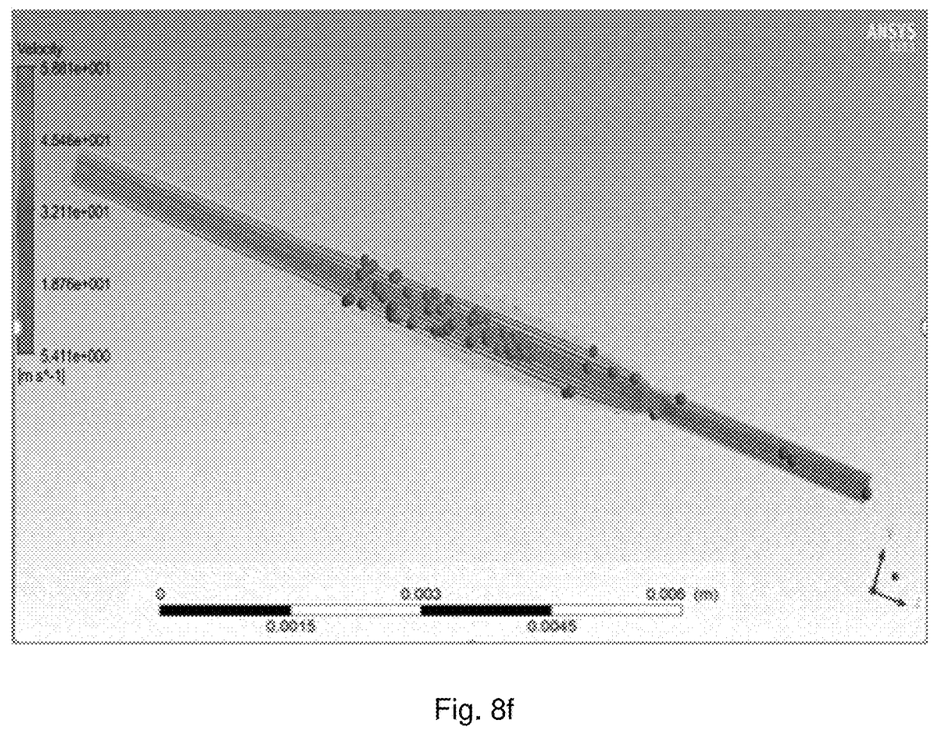

Vasa vasorum exist in the adventitial layer. During vein dissection, the adventitial layer and vasa vasorum are damaged to induce a hypoxic condition in the vascular wall. This hypoxic condition provokes unbalanced vascular nutrition and oxygen supply to promote the intimal influx of smooth muscle cells, leading to neointimal formation. Thus, it is necessary to induce angiogenesis in the outer vascular wall. Entry of a foreign matter into the body from the outside spontaneously induces a foreign body response leading to mild inflammation. That is, when the shape memory polymer is inserted into the body during the blood vessel wrapping procedure, mild inflammation occurs around vessels. This mild inflammation induces angiogenesis and the newly generated capillary vessels act as vasa vasorum. Immunostaining to capillary vessels (Flk1) and smooth muscle cells (α-SMA) revealed the existence of capillary vessels in normal vein and smooth muscle cells in the media layer and the adventitia. After establishment of the vein to artery model, capillary vessels were damaged and were not regenerated in the non-wrapping group (w/o external wrapping) so that the intimal influx of smooth muscle cells was accelerated, provoking vascular stenosis. In contrast, microvascular structures were found in the porous structure in the wrapping-applied group (w/ external wrapping), so that smooth muscle cells migrate toward adventitia to form neo-adventitia with the resultant inhibition of neointimal formation (see FIG. 7).

After establishment of the vein to artery graft model, the vein did not endure the relatively strong arterial pressure due to its poor physical properties compared to the artery, but underwent excessive dilatation. In the foregoing, the vascular wrapping was confirmed to have a suppressive effect on vascular dilatation. Such dilatation and suppression thereof may have influence on the pattern of blood flow from the artery to the dilated vein and then to the artery. If the blood flow is in turbulence, endothelial dysfunction occurs to inhibit anti-thrombotic and anti-inflammatory functions of vascular endothelial cells and induce the intimal influx of smooth muscle cells, resulting in stenosis. Shapes of the vein-to-artery graft inner wall immediately after the vein-to artery graft intervention and before and after the application of the wrapping device were depicted in a CAD file format. Using this CFD was performed to determine changes in blood flow pattern according to pulsatile flow. In this regard, it was assumed that there was no expansion/contraction movement of blood vessels according to the physical properties of blood vessels and polymers, and blood flow because simulations were performed using only the shape of the inner wall of blood vessels. As a result, the simulations indicated that the vein dilatation to up to 1270 mm after application of the wrapping device did not induce turbulence in the pulsatile flow whereas remarkable turbulence occurred in the vein dilated to about 1450 mm in the non-wrapping group. That is to say, it was indirectly confirmed that the vascular wrapping suppresses vascular dilatation and inhibits the formation of an eddy in blood flow, with the consequent prevention of stenosis.

What is claimed is:

1. A porous, outer vascular wall-wrapping device, comprising a biocompatible polymer material,
    wherein the device is configured to be in an original shape or a temporary shape,
    wherein the original shape is a hollow cylindrical structure one side of which is cut in a lengthwise direction to allow a blood vessel to be inserted into a hollow space of the device, and the temporary shape is a curved or planar shape formed by application of an external stimulus,
    wherein opposite ends formed by the cutting are apart from each other in the temporary shape, and the device is recovered to the original shape as the device is bent in a curvature-increasing direction by gradually decreasing the external stimulus in a controlled manner, so as to wrap around an outer vascular wall,
    wherein the polymer material comprises x % PCL (poly-ε-caprolactone)-co-y % PGMA (poly-glycidyl methacrylate),
    wherein x % and y % each represent mol % for corresponding units, with x+y=100 under a condition of x being 92 to 96, and
    wherein the device has a mean pore diameter in a range of 300 μm to 500 μm, and a porosity in a range of 50% to 70% relative to a total area of the device.

2. The device of claim 1, wherein the external stimulus is a change in temperature, physical power, pH, light, voltage, or osmotic pressure.

3. The device of claim 2, wherein the change in temperature condition is a change to a temperature higher than a body temperature.

4. The device of claim 1, wherein the outer vascular wall-wrapping device is recovered to the original shape and retain the original shape in an in-vivo environment.

5. A method for fabrication of an outer vascular wall-wrapping device, the method comprising the steps of:
    (a) photo crosslinking a mixture of a biocompatible polymer material, a photoinitiator, and a porogen into a tube shape to prepare a tube-type device;
    (b-1) removing the porogen from the prepared tube-type device;
    (b-2) cutting one side of the prepared tube-type device in a lengthwise direction parallel to a central axis of the tube-type device; and
    (c) inducing the one side-cut tube-type device in a temperature condition higher than a body temperature into a temporary shape allowing blood vessel to be inserted thereinto, and then fixing the one side-cut tube-type device in a temperature condition lower than room temperature,
    wherein the polymer material comprises x % PCL (poly-ε-caprolactone)-co-y % PGMA (poly-glycidyl methacrylate), wherein x % and y % each represent mol % for corresponding units, with x+y=100 under the condition of x being 92 to 96.

6. The method of claim 5, wherein the porogen is at least one selected from the group consisting of gelatin, sodium chloride, sodium bicarbonate, ammonium bicarbonate, polyethylene glycol, and hexane.

7. The method of claim 5, wherein the temperature condition higher than the body temperature ranges 42° C. to 65° C.

8. The method of claim 5, further comprising a step of additionally providing pores subsequently to any one of steps (a) to (c).

* * * * *